US009086325B2

(12) United States Patent
Nash et al.

(10) Patent No.: US 9,086,325 B2
(45) Date of Patent: Jul. 21, 2015

(54) SENSOR ARRAY

(75) Inventors: Philip J. Nash, London (GB); Edward Austin, Southampton (GB); Frank Eisenhower, Haslemere (GB); Richard Luff, West Byfleet (GB)

(73) Assignee: TGS Geophysical Company (UK) Limited, Godalming, Surrey (GB)

( * ) Notice: Subject to any disclaimer, the term of this patent is extended or adjusted under 35 U.S.C. 154(b) by 6 days.

(21) Appl. No.: 14/004,466

(22) PCT Filed: Mar. 12, 2012

(86) PCT No.: PCT/GB2012/000239
§ 371 (c)(1),
(2), (4) Date: Nov. 19, 2013

(87) PCT Pub. No.: WO2012/123698
PCT Pub. Date: Sep. 20, 2012

(65) Prior Publication Data
US 2014/0063493 A1    Mar. 6, 2014

(30) Foreign Application Priority Data
Mar. 11, 2011 (GB) .................................. 1104196.9

(51) Int. Cl.
*G02B 6/00* (2006.01)
*G01J 1/44* (2006.01)
(Continued)

(52) U.S. Cl.
CPC ............... *G01J 1/44* (2013.01); *G01D 5/35383* (2013.01); *G01V 1/3808* (2013.01)

(58) Field of Classification Search
CPC .................... G01D 5/35383; G01V 1/3808
USPC ................................................. 367/134, 149
See application file for complete search history.

(56) References Cited

U.S. PATENT DOCUMENTS 4,628,493 A * 12/1986 Nelson et al. .................... 367/79
7,366,055 B2 * 4/2008 Ronnekleiv et al. ............ 367/64
(Continued)

FOREIGN PATENT DOCUMENTS

GB    2454359    5/2009
GB    2478915    9/2011
(Continued)

OTHER PUBLICATIONS

International Search Report from related PCT application PCT/GB2012/000239, Jul. 5, 2012, 5 pgs.
(Continued)

*Primary Examiner* — Omar R Rojas
(74) *Attorney, Agent, or Firm* — Brooks, Cameron & Huebsch, PLLC

(57) ABSTRACT

An arrangement for monitoring a submarine reservoir includes a number of sensor units located in an array on the seabed, and an interrogator unit for obtaining data on the reservoir from the sensor units. The interrogator unit includes a transmitter unit for sending optical signals to the sensor array and a receiver unit for receiving modulated optical signals from the array. Optical radiation from an optical source is transmitted along an uplink optical fiber which is split in a number of positions to form the array. The receiver unit includes optical-to-electrical converters for converting the optical signals to electrical signals, a phase demodulator, a multiplexer, a signal processor, and recording unit. The interrogator unit is divided into a concentrator and an interrogator hub, where signals are transmitted between the interrogator hub and concentrator along a riser cable. This enables the interrogator to be moved between a platform and the seabed.

21 Claims, 7 Drawing Sheets

(51) Int. Cl.
*G01D 5/353* (2006.01)
*G01V 1/38* (2006.01)

(56) References Cited

U.S. PATENT DOCUMENTS

| | | |
|---|---|---|
| 2002/0172562 A1 | 11/2002 | Worman et al. |
| 2004/0156267 A1 | 8/2004 | O'Brien et al. |
| 2008/0123467 A1* | 5/2008 | Ronnekleiv et al. ............ 367/20 |
| 2009/0147626 A1 | 6/2009 | Vahida et al. |

FOREIGN PATENT DOCUMENTS

| | | |
|---|---|---|
| WO | 9807049 | 2/1998 |
| WO | 2008149059 | 12/2008 |

OTHER PUBLICATIONS

EP Search Report for related GB application GB1104196.9, Jul. 2, 2012, 1 pg.

* cited by examiner

SENSOR ARRAY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

This invention relates to sensor arrays, and especially to passive optical sensor arrays that are located in environments in which the sensor array is difficult to access. The invention is particularly suitable for undersea seismic sensor arrays, although it will be appreciated that the invention may be employed with sensors of other types. For example, the array may be employed with electric field sensors for determining the presence of oil by changes in the electric field as the conductivity of the rock that contains the oil changes. In other systems, the array could be part of a security warning system that contains a number of hydrophones for detecting unauthorised vessels.

Undersea seismic sensor arrays are widely used in the exploration of and monitoring of oil and gas reservoirs beneath the seabed. In these seismic monitoring techniques, an array of accelerometers and/or hydrophones are deployed as sensor packages on the seabed and are used to detect reflected seismic waves, and the results are analysed to provide information relating to the nature and state of geological structures beneath the seabed.

Typically a large number of sensors, for example 16,000 or more, are arranged along a number of optical cables that are spaced apart from one another to form a two-dimensional array that extends over a large area for example an area of 100 square kilometers or more. In one form of arrangement which may be referred to as a "4C" sensor unit, three seismic vibration sensors are arranged in orthogonal directions together with one hydrophone to form an optical sensing unit (OSU), and a number of optical sensing units are located along an optical line at spaced apart intervals, for example in the range of from 20 to 100 meters. A number of lines, for example 30 although more or fewer may be employed, may extend from a hub located on the seabed in a direction generally parallel to one another and spaced apart from one another, for example by from 100 to 500 meters, to form the array. The hub may be connected by an optical cable to an interrogator located on an exploration or production platform or on a floating production and storage offloading vessel (FPSO) that monitors the sensors by reflectometry or other interferometric means. The optical cable will contain at least one optical fibre for each of the lines that extend from the hub (typically one fibre pair). In operation, the interrogator sends an optical pulse along the cable where it is split at the hub before being sent along the individual lines to the optical sensor units. The vibration sensors may comprise a length of optical fibre that is wound around a flexible former to form a coil, and the optical lines may contain reflectors, for example formed by a mirror that terminates a fibre spliced with the line, preferably upstream and downstream of the sensors. As the external pressure varies, the coil of fibre is compressed or released, thereby changing the length of fibre in the coil. If a signal is sent along the optical fibre, it is partially reflected back along the line at each of the mirrors so that the signal, for example a phase shift in the signal that is dependent on the distance between the reflectors, is affected by any seismic activity. In this way, any mechanical impulse caused by an air gun or other explosion in the vicinity of the array will cause a phase change in signals reflected by the sensors in the array which may be observed by the interrogator.

The signals that are sent along the optical lines will normally be multiplexed in view of the large number of sensor units, usually both time division multiplexed and wavelength division multiplexed.

The interrogator of the system thus typically comprises a transmitter having a number of light sources such as lasers, e.g. 16, for forming the optical signals, and optical switches, and a receiver for receiving and processing the reflected optical signals. The receiver will need to demultiplex a number of wavelength and time division multiplexed streams arriving from the various optical lines of the sensor array, convert the optical signals to electrical signals, digitise them and transmit them onwards or store them. The interrogator is normally the only part of the system which contains electronics or requires electrical power.

Such sensor arrays may include a large number of optical fibre pairs, for example 100 to 200 pairs or more depending on the size of the array, and even up to 700 fibres in some cases, and these will extend from the hub to the platform or FPSO in the form of a riser cable which extends generally vertically from the seabed, although there may be a significant horizontal component, whereupon the cable will extend to a receiver unit of the interrogator located on the platform or FPSO.

While such systems generally work well in practice, they can have a number of problems. For example, in some forms of design where the sensor array is a long distance from the interrogator this would require a riser cable with 100 to 200 fibre pairs extending in the region of 100 km or more between the interrogator and the array, which can be impractical and extremely costly. In other circumstances the platform or FPSO may employ existing optical cables for receiving data from the array, in which case it may not have sufficient optical fibres in the riser. For example many installations may employ existing optical cables having only six fibres or so. In yet other instances, it can be difficult to direct the fibres in the cable from the riser to the interrogator and, in many circumstances, such a riser cable termination is not possible. For example, in the case of an FPSO, the riser cable may emerge onto a stationary turntable whereas the rest of the interrogator will be located on the vessel which may rotate about the turntable at least to a limited extent due to tides and currents etc. This will often require some means of allowing the optical fibres to rotate about the axis of the riser cable at least to a limited extent, for example a slip ring otherwise called a fibre optic rotary joint, to allow the optical fibres to extend between the riser cable and the interrogator on the FPSO. However, such slip rings typically only accept a few optical fibres and even the largest number of optical fibres that can be accepted by a slip ring (31 at this time) is only a fraction of the number of optical fibres in a typical riser cable, so that seven slip rings would be required. Furthermore, the specification of such a slip ring is insufficient for the purpose of a seismic optical fibre array in many cases since the two-way insertion loss may be 9 dB bringing the insertion loss of the array above 60 dB in some cases. In addition, the minimum return loss of the slip ring may be 18 dB, which means that back reflections my be sent to the array degrading its performance, or alternatively isolators would be required in order to prevent such back reflections. Finally, the physical size of the interrogator may be quite large, in the order of two or three cubic meters, and there may not be enough space on the platform or FPSO for the interrogator.

BRIEF SUMMARY OF THE INVENTION

According to one aspect, the present invention provides a sensor arrangement for monitoring a submarine reservoir, which comprises:

a sensor array comprising a plurality of sensor units located or to be located over an area of the seabed in the region of the reservoir to be monitored; and an interrogator unit for obtaining data on the reservoir from the sensor units, which comprises a transmitter unit for sending optical signals to the sensor array, and a receiver unit for receiving modulated optical signals from the array in response to the transmitted optical signals;

the transmitter unit comprising an optical switch, for example an acousto-optical modulator (AOM) for receiving optical radiation from an optical source and transmitting optical signals generated thereby along an uplink optical fibre, and at least one splitter for splitting the uplink optical fibre into a plurality of optical fibres that extend to the sensors over the area to be monitored; and the receiver unit comprising an optical-to-electrical converter for converting optical signals from each fibre of the array to electrical signals, a phase demodulator, a multiplexer for multiplexing the electrical signals from the phase demodulator, and a signal processing and recording unit for recording the multiplexed signals.

The interrogator unit may be divided into a concentrator and an interrogator hub, the concentrator including the splitter and the optical-to-electrical converter, phase demodulator and multiplexer of the receiver unit and the interrogator hub including the optical source and optical switch of the transmitter unit, the signal processing and recording unit, such that the optical source, optical switch, signal processing and recording unit can be located on a platform or on shore, and the electrical-to-optical converter, phase demodulator and multiplexer can be located on the seabed.

The interrogator unit may include means for transmitting signals from the or each concentrator to the interrogator hub along a single line or wirelessly.

The sensor arrangement according to the invention has the advantage that, by dividing the receiver, and preferably the transmitter and receiver, into two parts, one underwater (the concentrator) and the other above water (the interrogator hub), and by multiplexing the signals from the sensor array in the underwater part of the receiver, only a small number of optical fibres are needed in the riser extending between the submerged part of the interrogator and the surface part. The particular number of optical fibres in the riser between the submerged and surface part of the interrogator will depend on the particular design of arrangement, but it is possible to employ only a single optical fibre for the uplink (i.e. from the transmitter to the array) and a single further optical fibre in the downlink (unless the signals are transmitted from the concentrator to the interrogator hub wirelessly) so that the riser contains only a single pair of fibres. Other optical fibres may be necessary or desirable depending on the circumstances as explained below.

The optical fibres extending from the interrogator hub to the array are preferably arranged spatially in proximity to the return fibres extending from the array to the interrogator hub, and especially together so that the sensors are connected to the hub by means of optical cables formed from a pair of fibres. In addition, the interrogator unit may have a number of configurations. For example in one design it may have only a single concentrator from which a number of fibres extend to the sensor array, each line of the array being formed from a pair of fibres. In another design, an optical cable formed from a relatively small number of optical fibres may extend from the interrogator hub to a passive hub where it branches into a number of further optical cables, each extending from the passive hub to a concentrator and typically having two fibres (one uplink carrying transmit pulses and one downlink containing digitised sensor data). From each concentrator the fibres extend to the array as described above. Such a design of array will contain more than two optical fibres in the riser cable, for example up to six or eight fibres or even more, but nothing like the number of fibres employed in prior art systems. Other configurations of array are also possible.

In some circumstances other fibres may be present, for example for sending timing signals to synchronise the transmitter and receiver. For example a further optical fibre for synchronisation may be present extending directly from the transmitter in the interrogator hub to the submerged part of the receiver, that is to say, bypassing the sensor array, although such an arrangement is not preferred since it will increase the number of fibres in the riser. Alternatively, timing signals may be sent from a synchronisation unit in the interrogator hub both to the acousto-optical modulator in the transmitter and to the phase demodulator and/or multiplexer of the receiver unit along the uplink or downlink optical fibre extending along the riser cable. In yet another arrangement, timing signals may be sent along an optical fibre extending on the transmitter side of one or more of the sensors in the array to the phase demodulator, for example in proximity to the downlink optical fibres extending from the array. Only a single such optical fibre is required for a complete array. In addition, it is possible for different fibres in the riser to send signals to and from different parts of the array of sensors depending on the layout of the array, but in such cases it is unlikely for more than six to eight optical fibres to be present in the riser.

It is possible for the concentrator(s) of the interrogator to be permanently secured to the seabed, especially if the electronic parts thereof are relatively simple, but the concentrator could be provided in a watertight module that is submersible and which can be raised up to the platform or FPSO for maintenance or repair but which otherwise remains on the seabed. Such a module may be provided with a stowage/deployment arrangement for stowing the riser cable when the module is raised and for deploying the cable when the module is lowered to the seabed.

Where the concentrator requires electrical power to be supplied, this may be supplied via the link to the interrogator hub, through a separate electrical cable from the platform shore or other seabed location, or via a local battery.

Although the interrogator hub and concentrator will often be located close to each (with one on the surface and one underwater) it is possible for the concentrator and the interrogator hub to be separated from one another, even by a large distance for example by up to 100 km or so.

Although the concentrator is normally located underwater, and the interrogator hub on the surface, in certain circumstances both may be located on the surface, for instance when the concentrator is located on a fixed turret and the interrogator hub on the rotating portion of a floating production platform (FPSO). In these cases, the concentrator is usually located at a location where space and power requirements may be limited, and it is desirable to minimise the number of optical fibres in the connection between the concentrator and the interrogator hub.

BRIEF DESCRIPTION OF THE SEVERAL VIEWS OF THE DRAWINGS

One form of arrangement in accordance with the present invention will now be described by way of example with reference to the accompanying drawings in which.

DETAILED DESCRIPTION OF THE INVENTION

Figure 1:
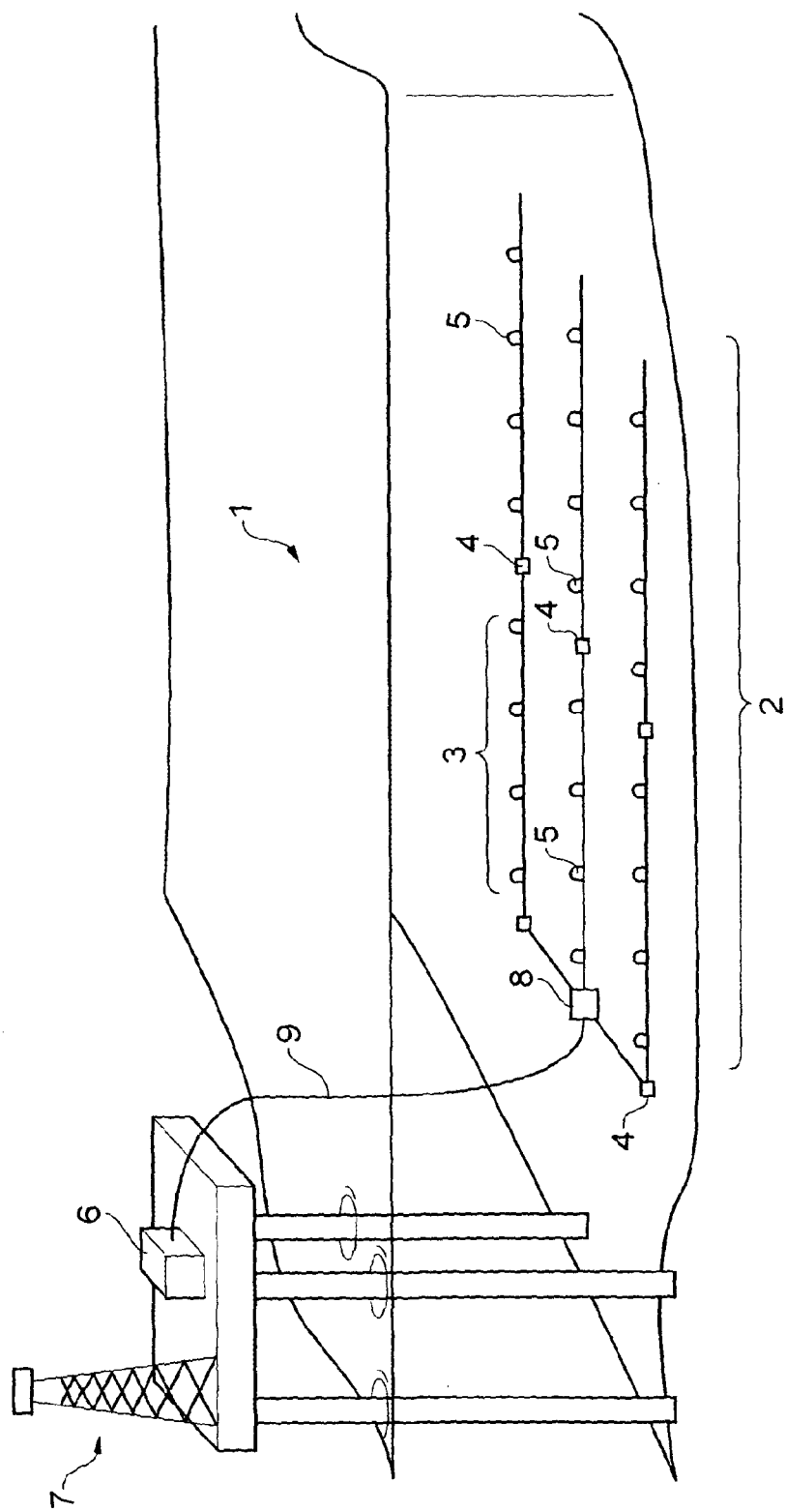
FIG. 1 is a schematic view of a conventional seismic sensor arrangement.

Referring to FIG. 1, there is seen a marine oil platform 7, supported on legs from the seabed. A seismic sensor array 1 as described in GB 2 449 941 is deployed on the seabed in order to detect changes in the underlying reservoir. The seismic sensor array comprises a plurality of seismic cables 2 each of which may be formed from a number of modules 3 that are joined by joint elements 4 and contain a number of sensor units 5 that are spaced apart along the cables. The connecting seismic cables 2 lead to a passive hub 8, where all of the seismic cables 2 are joined to form a riser cable that extends from the hub 8 to an operating system 6 on the platform 7. Signals are generated by a transmitter in the operating system or interrogator 6 and sent to the sensor units 5, and returns are received from the sensor units 5 at the operating system 6, where the signal returns are analysed in order to determine the nature of the structures beneath the seabed. As indicated above, this form of array has the disadvantage that the riser cable will need to employ a large number of optical fibres, for example from 50 to 200 fibres or more.

Figure 2:
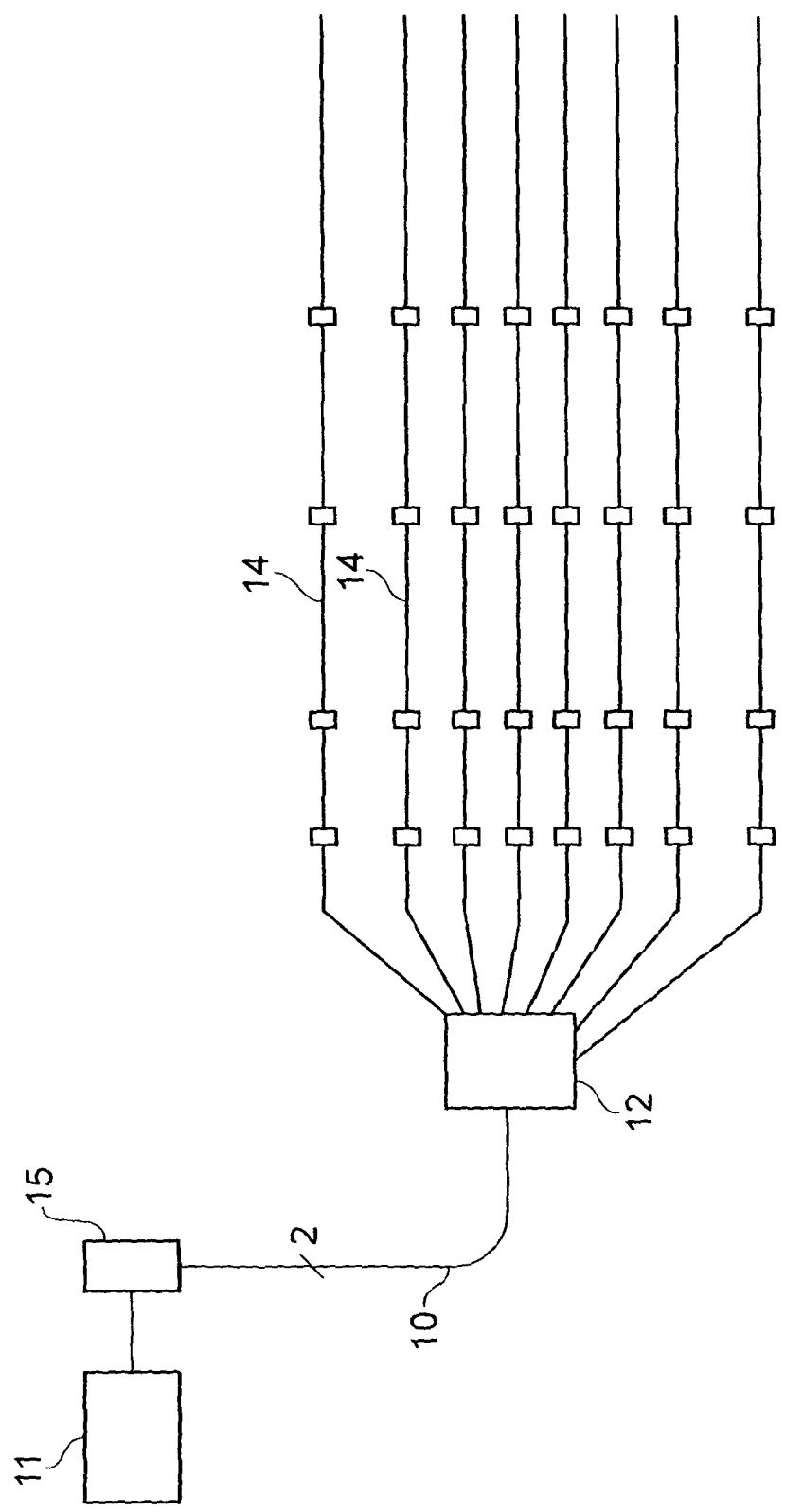
FIG. 2 is a schematic view of one form of sensor array topography according to the invention.

As shown in FIG. 2, one form of sensor array similar to that shown in FIG. 1 is shown in which a riser cable 10 comprising just a pair of optical fibres extends from an interrogator hub 11 that is located on the platform and includes a transmitter unit and receiver unit. The cable extends to a concentrator 12 located on the seabed in the region of the platform where the optical fibres in the cable are split to form a number of separate seismic cables 14 corresponding to the cables 2 of FIG. 1 which extend from the concentrator over the region of interest. In addition, a slip ring 15 may be located at the interrogator hub in order to accommodate relative rotational movement between the riser cable and the interrogator hub.

Figure 3:
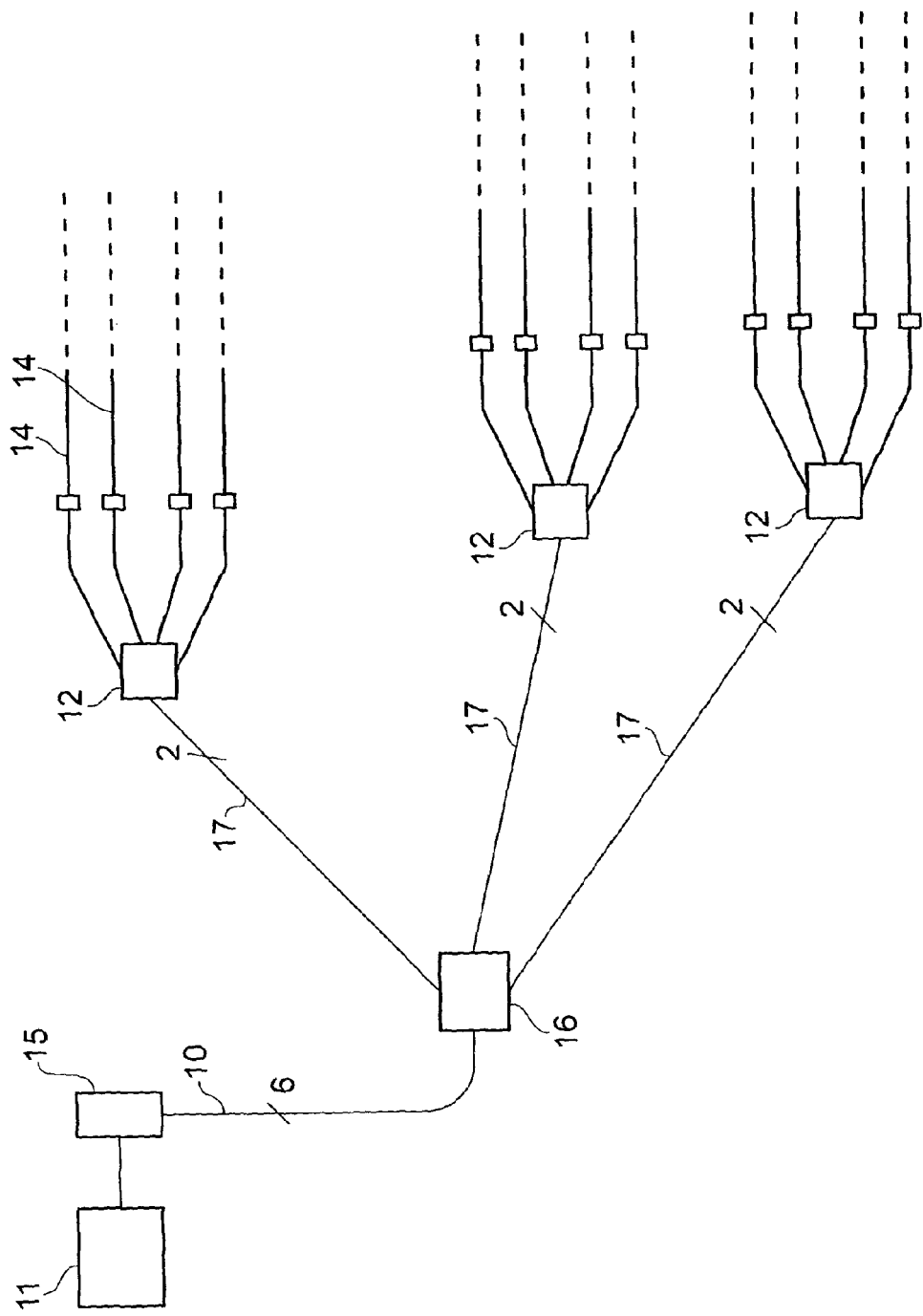
FIG. 3 is a schematic view of another form of sensor array topography according to the invention.

An alternative topography for the sensor is shown in FIG. 3 in which a riser cable 10 comprising in this case six optical fibres extends from the interrogator hub 11 to a passive hub 16 where the optical fibres are divided into three separate optical cables 17, each having a pair of fibres. Each of the optical cables 17 extends to a concentrator 12 where the fibres in the cable are split as before to form a number of seismic cables 14.

A sensor unit 5 that may be employed in the sensor typically comprises three seismic sensors arranged in orthogonal directions and a hydrophone. Each seismic sensor is in the form of a coil of optical fibre wound around a former whose diameter will vary slightly when subjected to seismic vibrations so that the length of the optical fibre coil will also vary. Between the coils of optical fibre are arranged mirrors or other reflection devices such as Bragg gratings, so that a signal sent along the optical fibre will be reflected by each mirror to form a pair of pulses whose separation will depend on the length of the optical fibre winding. Such sensor units comprising three orthogonal seismic sensors and a hydrophone may be referred to as an optical sensing unit (OSU). The sensors may also be connected in other ways well known in the field, for instance in a transmissive coupler configuration The seismic sensors and hydrophone are fibre optic devices, and the connection cable will comprise a number of optical fibres for connecting the sensors of each sensor unit to its neighbours in the chain. In one embodiment, a continuous length of cable 2 may connect all of the sensor units in a deployment device. The cable may have a number of optical fibre pairs running along its length, and at each sensor unit a single fibre may be drawn out of the cable and connected to the sensors of that sensor unit.

Each optical sensing unit (OSU) will require four channels (one for each seismic sensor and one for the hydrophone) and may be deployed in groups of four, which require 16 optical channels per group. This may conveniently be achieved by time division multiplexing, in which the input optical signal is pulsed and returning optical pulses from different sensors are distinguished by time of flight. Additional multiplexing that is required in order to interrogate all the optical sensing units is achieved by means of wavelength division multiplexing, in which pulses of a number of different wavelengths, typically 16, are sent into the system and each wavelength is routed to a separate set of time multiplexed sensors using commonly known wavelength selective components. The received signals are therefore sent from the optical sensing units to the receiver as a number of time division multiplexed and wavelength division multiplexed streams. The optical signal from each sensor contains the data from that sensor encoded as a phase modulation. Typically, the receiver may receive in the order of 30 different TDM/WDM streams corresponding to 480 channels. An implementation of this architecture is described in European Patent No. EP 1 169 619 B1.

Figure 4:
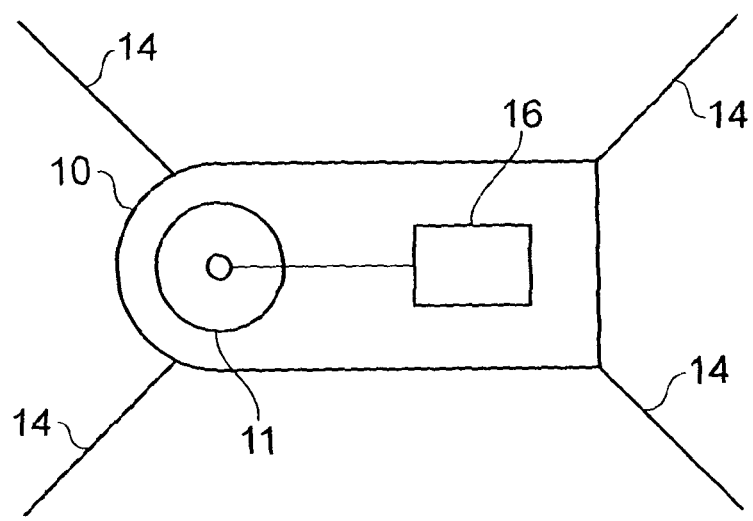
FIG. 4 is a schematic view of an FPSO in which an arrangement according to the invention may be used.

In addition to being deployed on a fixed oil production platform as shown in FIG. 1, the arrangement may be terminated on a floating production and storage offloading vessel (FPSO) shown schematically in FIG. 4. This is essentially a vessel 10 having a fixed turret 11 through which the riser cable extends. The vessel is tethered by means of cables 14, but the vessel may yaw to some extent by virtue of waves, currents and tides, so that the vessel 10 may rotate around the fixed turret 11. The interrogator 16 is located on the vessel.

Figure 5:
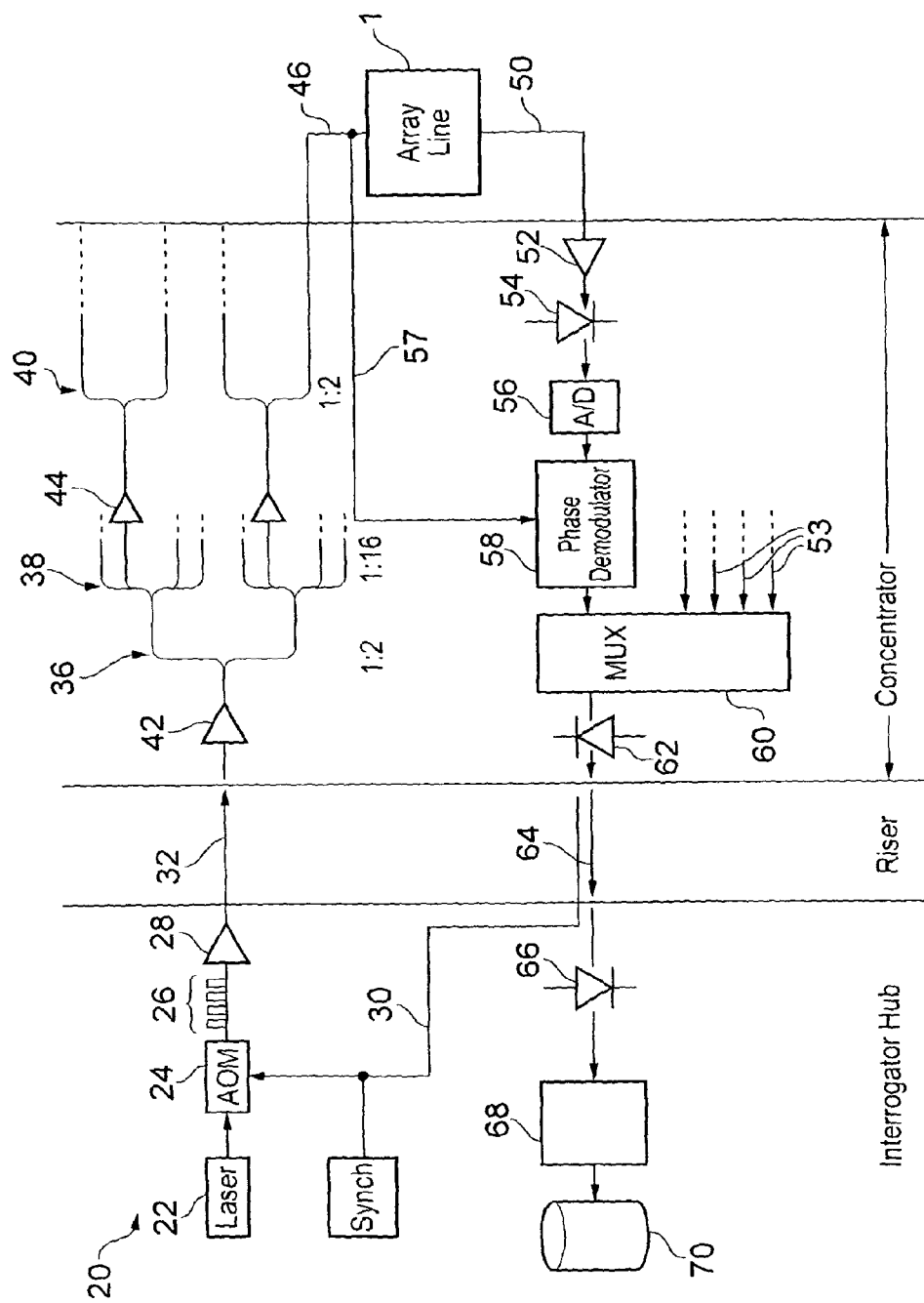
FIG. 5 is a schematic diagram showing the principal parts of the arrangement according to the invention.

FIG. 5 is a schematic diagram showing the principal layout of the arrangement according to the invention. The arrangement comprises an interrogator forming the main part of the diagram which comprises an interrogator hub 20 and a concentrator connected to each other by a riser cable. The interrogator sends signals to a sensor array as shown in FIGS. 2 and 3, one line 1 of which is shown, and receives, processes and stores return signals from the array. The interrogator comprises a transmitter for sending an optical drive signal to the array comprising a high specification laser source 22 for generating a constant optical signal and an acoustic optical modulator (AOM) 24 (or other suitable optical switch as such an electro-optic switch) for pulsing and frequency shifting the optical signal. Typically the AOM will produce a pair of pulses, one of which is time delayed and frequency shifted by typically 50 KHz with respect to the first pulse, from the transmitter to the array so that a train of pulses is reflected by the mirrors located between the sensor coils of the OSUs within the array. If the time delay of the second pulse corresponds to the time taken for a pulse to travel through one coil between the two mirrors and its return following reflection by the mirror on the far side of the coil, pulses will be generated which are a superposition of initial and time delayed pulses 26 reflected by different mirrors in the array, and this superposed pulse, which is at a difference frequency of typically 50 kHz, carries the phase information from the sensor between those mirrors as a phase modulation of the carrier frequency. The repetition rate of this pulse pair 26 is typically 200 kHz and this may be amplified by means of amplifier 28. The interrogator may also need to generate a timing or synchronising signal 30 which is sent to the AOM of the transmitter and also to the concentrator. The laser source 22, AOM 24 and any amplifier 28 that may be present will normally be located on the platform or FPSO within the interrogator hub 20. The arrangement includes an optical fibre 32, preferably a single optical fibre, which forms part of the riser cable and extends from the platform or FPSO down to a concentrator located on the seabed in the region of the platform. In the concentrator are typically located a number of splitters, for example a 1:2 splitter 36, 1:16 splitters 38 for each of the fibres from the splitter 36 and further 1:2 splitters 40 to split the optical fibre 32 into 64 fibres. The fibre may be split into any appropriate number of fibres, but will normally be split into 128 fibres or so. In addition, further amplifiers 42, 44 may be present The optical signal may be amplified directly by means of an optical amplifier, for example an erbium doped fibre amplifier (EDFA). Any amplifier employed may also be a distributed optical amplifier which amplifies the optical signals continuously along part or the whole of the link between the interrogator and the array 1.

The array comprises a two dimensional array of optical sensing units (OSUs) formed in each array line, and each sensing unit comprising three orthogonally oriented seismic vibration sensors and one hydrophone, the vibration sensors being typically separated by mirrors so that the delay and hence the phase change of signals reflected by the mirrors will depend on the parameter being detected by the OSUs. The sensors may also be connected in other configurations allowing measurement of individual sensor optical phase change.

After leaving the array the fibres return to the concentrator. Only a single fibre 50 is shown leaving the array line 1 for the sake of clarity as indeed only a single fibre 46 is shown entering the array, but as indicated above, typically 64 to 128 fibres will be employed. After leaving the array, the signals may be amplified by a further amplifier 52 (one for each optical fibre 50 leaving the array) which will typically be located inside the concentrator or may be located outside it if a distributed amplifier is employed. After amplification, the signal is passed to an optical-to-electrical converter typically comprising a detector formed from a p-i-n or avalanche photodiode 54. The electrical signals so produced are sent to an A/D converter 56 to sample the signals, for example at 200 kHz, and to digitise them, and the digital signals are passed to a phase demodulator 58. In one implementation, the signals will have a carrier frequency of 50 kHz, which is phase modulated by the seismic signal which will typically be in a frequency range of 5-500 Hz.

After phase demodulation, the signals from the optical fibre 50 together with the signals on all the other optical fibres 52 from the array are multiplexed by means of multiplexer 60 which also receives timing signals sent from the interrogator hub. As an alternative to sending timing signals directly to the receiver, timing signals sent to the array line by the transmitter may be detected before being sent to the array and then sent to the phase demodulator 58 by fibre 57. The multiplexed signal is then converted to an optical signal by diode 62 or laser. The multiplexing may be performed electrically or optically or by a mixture of both and the signal on the fibre exiting the submersible module will preferably be wavelength division multiplexed (WDM) especially dense wavelength division multiplexed (DWDM) in which up to 128 signals may for example be carried by a single fibre on the 1550 nm band.

The DWDM signal is then carried by a single optical fibre 64 in the riser cable to the platform or FPSO whereupon it is converted to an electrical signal by means of photodetector 66 and sent to signal processing module 68 where the data is recorded and stored on disc 70 if necessary. Often the signal processing module 68 and disc or other recorder will be located physically close to one another in the same interrogator module or housing, but, as indicated above, the transmitter and receiver of the interrogator may be physically separated by a significant distance. Similarly, it is possible for different parts of the receiver to be separated between the concentrator and the interrogator hub. For example, it is possible for the receiver to include a communications module for packetising the multiplexed signals and sending them along a transmission channel to a recorder 70 as a single data stream, using techniques well known in digital data communications. The communications module may be operative to send the data from the demodulator 58 and multiplexer 60 by any appropriate means, for example by means of a satellite or microwave link, although it will normally be operative to send the data from the demodulator my means of a cable, especially an optical cable. This may be the same cable as the riser cable or a different cable.

For a typical array, the receiver will receive 16 time division multiplexed data streams each of which is converted into an electrical signal using a separate photodiode 54. These are WDM multiplexed at 16 wavelengths, leading to 256 TDM data streams. The electrical data streams are digitised to generate 256 time domain multiplexed phase modulated outputs by the phase modulator 58. In a typical heterodyne modulated system, each channel will have a heterodyne carrier frequency of 50 kHz and will be sampled at a sampling frequency of 200 kHz, although many other configurations of phase modulated data are possible. It will be necessary to multiplex the data at a rate sufficiently high to ensure that full bandwidth of the modulated data has been captured, so allowing accurate demodulation of the data. For example, in a typical system a data sample rate of 50 kHz with 32 bits per sample, 16 channels per wavelength and 16 different wavelengths will generate a signal with 0.4Gbits per second for each sensor line. If 64 sensor lines are employed as described above, this gives a total data transmission rate of 26 Gbits per second transmitted along fibre 64. Clearly other data sample rates, or even data compression techniques may be chosen resulting in a different total data transmission rate.

The arrangement according to the invention thus enables the array 1 to be connected to the main part of the interrogator (the interrogator hub), i.e. those parts of significant size or which involve significant electronic signal processing, by only a small number of optical fibres so that conventional slip rings may be used, or even, depending on the form of packaging of the optical fibres, so that slip rings may be dispensed with and so that any change in direction of the fibre in the system may be accommodated by bending of the fibre. As described above with reference to FIG. 5, the concentrator may be placed on the sea bed within a waterproof module requiring only a small number of fibre and power connections to the interrogator. The concentrator could include a stowed multi-way riser cable connecting the multiplexing optics and electronics to the array cables.

Figure 7:
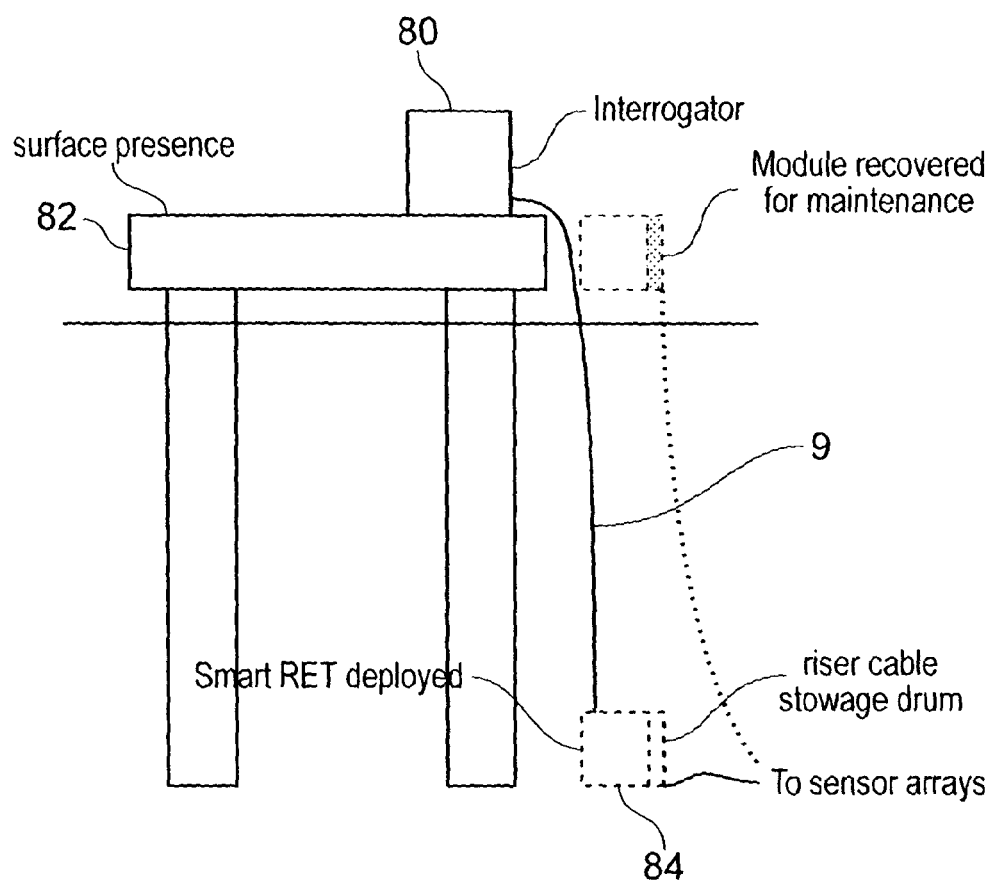
FIG. 7 is a schematic view of an arrangement that employs a submersible module.

Such a form of concentrator is shown schematically in FIG. 7. Here the interrogator is formed as a permanent installation 80 (which is the interrogator hub) on a platform 82 and includes a submersible module 84 (housing the concentrator) that is connected to the permanent installation 80 by the riser cable 9 comprising optical fibres 32 and 64 optionally together any electrical cables. The submersible module will house those parts of the interrogator which are located underwater, typically, the receiver demodulator and multiplexer, and also preferably parts of the transmitter as described above. The total volume of those parts of the interrogator within the submersible module will be of the order of 0.2 cubic meters, significantly smaller than the full interrogator which will have a volume of at least 3 cubic meters. The submersible module may include a reel or other means for stowing the riser cable that is able to collect the riser cable as the module is raised onto the platform 82 and to pay out any other cable if necessary connected to the array in order to accommodate the change in position of the module. Similarly the module may be arranged to pay out the riser cable 9 as it is lowered from the platform to the seabed and to collect any other cable attached to the array. The submersible module would normally be located on the seabed, although it could be used at any position in the water column.

It is possible in other instances to employ a multi-fibre riser cable with one fibre for each sensor unit of the array, and to locate the termination (including the phase demodulator and the multiplexer) on a stationary turret of an FPSO with single fibres directed to the interrogator unit on the main part of the FPSO by means of conventional slip rings. The termination that employs the submersible module could be employed with an FPSO if desired.

It is possible that more than 1 concentrator is used, as shown in FIG. 3. In this case the individual concentrators 12 are each connected by a transmit optical fibre and a return datalink to the interrogator hub 11 via passive hub 16 which combines the individual transmit fibres and return fibres (if used) into a single riser 6. Alternatively the concentrators 12 may be connected via a single cable arranged in a loop which connects all the concentrators to the passive hub. The loop may be arranged such that the signals can be transmitted in either direction around the loop As described with respect to FIG. 5, the sensor array sends phase modulated optical pulses whose phase modulation amplitude is dependent on the output of the sensors along the fibre 50 to the receiver. However, it is possible for the returned pulses to have too high a phase modulation amplitude and to cause phase based sensed information to become distorted leading to failure of the demodulation process. According to a preferred aspect of the invention, the sensors of the sensor array may be operable to generate derivative signals (that is, signals dependent on the rate of change of phase) instead of, or in addition to, the signals dependent on the amplitude of the phase. For example, this may be achieved as described in WO2008/110780, the disclosure of which is incorporated herein by reference. In this case, since two derivative signals are sent in addition to the phase amplitude signals, there will be approximately three data streams instead of one, and the system will require three times the bandwidth. The derivative return pulses (which are dependent on the rate of change of phase) will have a much lower phase modulation amplitude than the pulses that are dependent on the amplitude of the phase, and so may be used instead of the amplitude return pulses. In this case it is possible for the arrangement to have a much larger dynamic range by relying on high sensitivity amplitude return pulses where required and otherwise to rely on lower sensitivity derivative return pulses.

It is possible to vary the sensitivity of the return signals by varying the time separation of the initial signal and so increase the dynamic range of the system. In addition, as described in WO2010/023434, the disclosure of which is also incorporated herein by reference, the optical fibre that returns the signals from the sensors may be split so that light may be sent to two different interferometers that reflect the light along the return optical fibres 50. One interferometer may have a relatively large path imbalance (say, 20 m or 200 ns) while the other interferometer may have a much smaller path imbalance (say, 1 m) which will be less than the pulse duration and will alter the dynamic value of the signal accordingly. As a result, it is possible for the derivative sensor technique to generate return pulses of a range of sensitivities, from high sensitivity return signals based on the amplitude of the reflected signals to medium and low sensitivity return signals based on the derivative of the phase of the reflected signals.

Although the derivative sensor technique may be used to generate return signals of three different sensitivities, different sensitivity signals for each of the different wavelengths in the WDM return signals may be carried by the same optical fibre. For example, one fibre may be used to carry medium sensitivity return signals (referred to as "long DST" signals, while another fibre may be used to carry full sensitivity and low sensitivity return signals (referred to as "normal" and "short" DST signals respectively.

Figure 6:
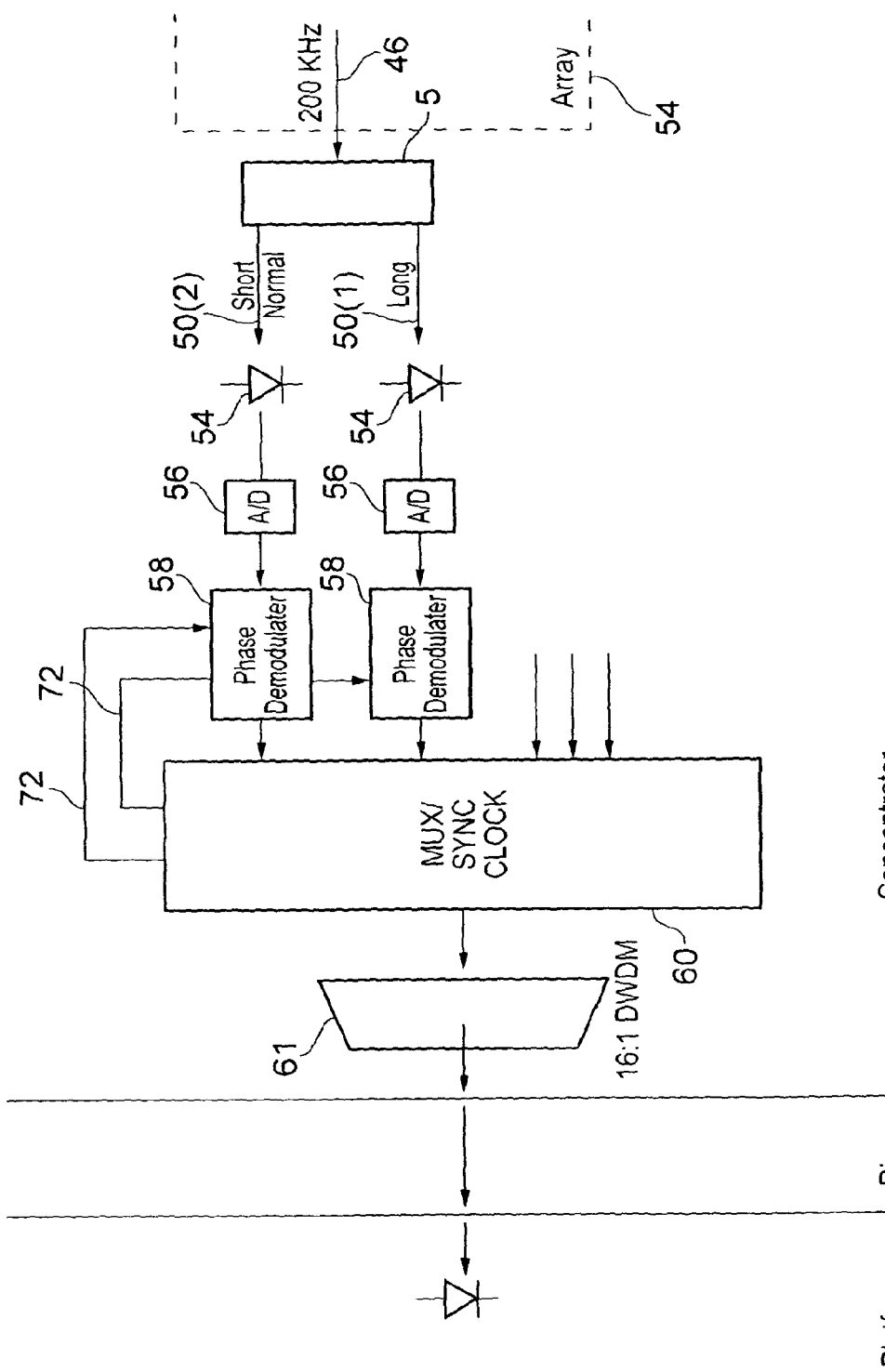
FIG. 6 is a schematic view showing part of the arrangement of FIG. 5 which uses a derivative sensor technique (DST)

The two fibres may extend in parallel to one another as shown in FIG. 6. A single optical fibre 46 transmits the pulses from the transmitter 20 to a number of interferometers 5 in the concentrator which generates three signals, one medium sensitivity DST derivative output (referred to as the long output) on optical fibre 50(1) and a full sensitivity amplitude output (referred to as the normal output) and a low sensitivity derivative output (referred to as the short output) that are multiplexed on optical fibre 50(2). In this case each of the separate lines are converted into electrical signals, amplified where necessary, digitised with a 200 kHz sample rate, phase demodulated by phase demodulators 58, and downsampled to a 1 kHz sample rate separately before being multiplexed with each other and with signals from the other OSUs in the array by multiplexer 60. Timing signals that have been sent from the interrogator hub down the riser cable and received by the multiplexer 60 are sent to the phase demodulators 58 along lines 72. In this arrangement, the phase delay between a 50 kHz synchronization signal and the incoming data will be computed at a data rate of 50 kHz. Data at approximately 1.5 Gbit $s^{-1}$ from four array lines received by fibres 50 and 53 of FIG. 5 will be multiplexed by the multiplexer 60 to generate payload of 5.84 Gbit s$^{-1}$ for each wavelength which can be transported by a 10 Gbit Ethernet line or other transmission protocol. The data from 16 lines is then multiplexed by multiplexer 61 by dense wavelength division multiplexing (DWDM) to allow data from 64 fibre pairs to be multiplexed on a single return fibre.

What we claim is:

1. A sensor arrangement for monitoring a submarine reservoir, comprising:
    a sensor array comprising a plurality of sensor units adapted to be located over an area of the seabed in the region of the reservoir to be monitored; and
    an interrogator for obtaining data on the reservoir from the sensor units, which comprises:
    a transmitter unit for sending optical signals to the sensor array, the transmitter unit comprising an optical switch for receiving optical radiation from an optical source and transmitting optical signals generated thereby along an uplink optical fibre, and at least one splitter for splitting the uplink optical fibre into a plurality of optical fibres that extend to the sensor units over the area to be monitored; and
    a receiver unit for receiving modulated optical signals from the sensor array in response to the transmitted optical signals
    the receiver unit comprising an optical-to-electrical converter for converting optical signals from each fibre of the sensor array to electrical signals, a phase demodulator, a multiplexer for multiplexing the electrical signals from the phase demodulator, and a signal processing and recording unit for recording the multiplexed signals;
    the interrogator being divided into at least one concentrator and an interrogator hub, the concentrator or concentrators including one or more of the splitters and the optical-to-electrical converter, phase demodulator and multiplexer of the receiver unit, and the interrogator hub including the optical source and optical switch of the transmitter unit, and the signal processing and recording unit of the receiver unit, such that the interrogator hub can be located on a platform or on shore, and the or each concentrator can be located on the seabed, at any position underwater, or on the platform at a location separate from the interrogator hub;
    the apparatus further including means for transmitting signals from the or each concentrator to the interrogator hub along a single line or wirelessly.

2. A sensor arrangement as claimed in claim 1, wherein the means for transmitting signals from the or each concentrator is operable to transmit the signals along a single line.

3. A sensor arrangement as claimed in claim 1, wherein one or more optical uplink fibres extend from the interrogator hub to the sensor array, the one or more optical fibres being arranged together with one or more optical downlink fibres extending from the sensor array to the interrogator hub in the form of a riser cable.

4. A sensor arrangement as claimed in claim 1, wherein the concentrator includes one or more optical amplifiers.

5. A sensor arrangement as claimed in claim 3, wherein the interrogator hub includes a synchronising unit for generating timing signals to synchronise the transmitter and receiver units.

6. A sensor arrangement as claimed in claim 5, which includes a further optical fibre for sending timing signals that extends directly from the transmitter unit in the interrogator hub to the concentrator bypassing the sensor array.

7. A sensor arrangement as claimed in claim 5, which is operable to send timing signals from the synchronisation unit in the interrogator hub to the switch in the transmitter unit and to the phase demodulator and/or multiplexer of the receiver unit along the one or more uplink or downlink optical fibres extending along the riser cable.

8. A sensor arrangement as claimed in claim 5, which is operable to send timing signals along an optical fibre extending on the transmitter side of one or more of the sensor units in the sensor array to the phase demodulator.

9. A sensor arrangement as claimed in claim 1, wherein the one or more uplink optical fibres extends at least 30 km.

10. A sensor arrangement as claimed in claim 1, wherein the transmitter and the receiver unit in the interrogator hub are located together.

11. A sensor arrangement as claimed in claim 1, wherein the concentrator is capable of being lifted to the surface of the sea.

12. A sensor arrangement as claimed in claim 3, wherein the one or more uplink and downlink optical fibres that extend between the concentrator and the interrogator hub extend via an optical slip ring.

13. A sensor arrangement as claimed in claim 1, wherein the interrogator hub is located on a floating production and storage offloading vessel.

14. A sensor arrangement as claimed in claim 1, wherein the sensor units of the sensor array are arranged to cause a strain to be exerted on the fibres in response to a parameter to be monitored.

15. A sensor arrangement as claimed in claim 14, wherein the sensor units of the array comprise coils in which the optical fibre is wound and which are operable to exert a strain on the optical fibre by seismic activity.

16. A sensor arrangement as claimed in claim 14, wherein the sensor units of the sensor array are operable to generate time-derivative signals in addition to amplitude signals.

17. A sensor arrangement as claimed in claim 16, which includes one downlink optical fibre for transmitting time-derivative signals, and one optical fibre for transmitting amplitude signals.

18. A sensor arrangement according to claim 1, in which electrical power is supplied to the at least one concentrator via a cable from the platform or other seabed location.

19. A sensor arrangement according to claim 1, in which electrical power is supplied to the at least one concentrator via a local battery within or adjacent to the concentrator.

20. A method of monitoring a submarine reservoir in which a sensor array comprising a plurality of sensor units is located over an area of the seabed in the region of the reservoir to be monitored; the method comprising obtaining data on the reservoir from the sensor units by:
    i. sending optical signals to the sensor array, the optical signals being generated by an optical source and sent along an uplink optical fibre;
    ii. splitting the optical signal and sending it into a plurality of optical fibres that extend to the sensor units over the area to be monitored;
    iii. receiving modulated optical signals from the sensor array in response to the transmitted optical signals;
    iv. converting the received modulated optical signals from each fibre of the sensor array to electrical signals;
    v. phase demodulating and multiplexing the electrical signals; and
    vi. signal processing and recording the multiplexed signals;

wherein the steps of sending the optical signals, and signal processing and recording the received signals, are performed in an interrogator hub located on a platform or on shore; and wherein the steps of splitting the optical signal, receiving modulated optical signals, converting the modulated optical signals into electrical signals, and phase demodulating and multiplexing the electrical signals are performed in one or more concentrators located on the seabed, at any position underwater, or on the platform at a location separate from the interrogator hub; and the method includes transmitting signals from the or each concentrator to the interrogator hub along a single line or wirelessly.

21. A sensor arrangement as claimed in claim 15, wherein the sensor units of the sensor array are operable to generate time-derivative signals in addition to amplitude signals.

\* \* \* \* \*